(12) United States Patent
Chen et al.

(10) Patent No.: US 9,698,580 B2
(45) Date of Patent: Jul. 4, 2017

(54) SCREWDRIVER HAVING CABLE-STRIPPING STRUCTURE

(71) Applicant: GONG FONG ENTERPRISE CO., LTD., Tainan (TW)

(72) Inventors: Yu-Lun Chen, Tainan (TW); Che-I Hu, Tainan (TW)

(73) Assignee: Gong Fong Enterprise Co., Ltd., Tainan (TW)

( * ) Notice: Subject to any disclaimer, the term of this patent is extended or adjusted under 35 U.S.C. 154(b) by 294 days.

(21) Appl. No.: 14/516,786

(22) Filed: Oct. 17, 2014

(65) Prior Publication Data

US 2016/0111861 A1    Apr. 21, 2016

(51) Int. Cl.
  *H02G 1/12*  (2006.01)
  *B25B 15/00* (2006.01)
  *B25G 1/00*  (2006.01)
  *B25B 15/02* (2006.01)
  *B25F 1/00*  (2006.01)

(52) U.S. Cl.
  CPC .......... *H02G 1/1214* (2013.01); *B25B 15/02* (2013.01); *B25F 1/00* (2013.01)

(58) Field of Classification Search
  CPC .... H02G 1/1212; H02G 1/1214; B25G 1/005; B25B 15/02
  See application file for complete search history.

(56) References Cited

U.S. PATENT DOCUMENTS

| | | | | |
|---|---|---|---|---|
| 3,114,277 A | * | 12/1963 | Clendenin | H02G 1/1214 30/113 |
| 3,608,401 A | * | 9/1971 | Freed | H02G 1/1214 7/108 |
| 3,636,798 A | * | 1/1972 | Van Dalen | H02G 1/1214 30/90.1 |
| 5,205,006 A | * | 4/1993 | Panasuk | H02G 1/1234 30/90.6 |
| 5,956,789 A | * | 9/1999 | Chou | B25B 15/00 30/90.1 |
| 6,081,953 A | * | 7/2000 | Chou | B25B 7/22 30/90.1 |
| 6,173,467 B1 | * | 1/2001 | Chou | B25B 9/00 7/165 |
| 8,621,961 B2 | * | 1/2014 | Burch | B25B 15/02 7/107 |

(Continued)

*Primary Examiner* — David B Thomas
(74) *Attorney, Agent, or Firm* — Rosenberg, Klein & Lee (57) ABSTRACT

A screwdriver having a cable-stripping structure has a grip provided with a combining portion having a first cable-stripping groove, and has a pressing plate combined with the combining portion and having a second cable-stripping groove positionally corresponding to the first cable-stripping groove. The screwdriver further has two knives each respectively installed in a first slit of the first cable-stripping groove and a second slit of the second cable-stripping groove and each having a cable-stripping blade aligned with a corresponding first cable-stripping groove or second cable-stripping groove, so that the pressing plate is allowed to move in a travel-limited manner along a screw-driving shaft inserted in the grip. The combining portion further has a fixing hole, while the pressing plate further has a holding hole corresponding in position to the fixing hole. Thereby the cable-stripping structure facilitates stripping and bending electric wires of different diameters.

8 Claims, 11 Drawing Sheets

(56) References Cited

U.S. PATENT DOCUMENTS

| | | | |
|---|---|---|---|
| 9,138,880 B2* | 9/2015 | Wang ................... | B25B 15/00 |
| 9,225,152 B2* | 12/2015 | Anderson .............. | B25H 3/02 |
| 9,450,388 B2* | 9/2016 | Anderson .............. | B25H 3/02 |
| 2016/0094019 A1* | 3/2016 | Chen .................... | H02G 1/1214 |
| | | | 7/108 |

* cited by examiner

SCREWDRIVER HAVING CABLE-STRIPPING STRUCTURE

BACKGROUND OF THE INVENTION

1. Technical Field

The present invention relates to a screwdriver capable of stripping electric wires of various diameters and bending cores of stripped electric wires.

2. Description of Related Art

The conventional screwdriver is a simple tool exclusively used for screwing screws. When wiring for electrical apparatuses is required, a worker going for the work has to additionally take one or more cable strippers with him/her, which is inconvenient. As an improvement, Taiwan Patent No. M456267 titled "Hand Tool Having Cable-Stripping Function" that has been published on Jul. 1, 2013 discloses a hand tool. This prior-art hand tool comprises a tool member, a grip and a cutting member. The grip has one end fixedly combined with the tool member and an opposite end provided with an axial hole. A cable-receiving chamber is formed inside the grip and communicated with the axial hole. The cutting member is such installed in the grip that its blade faces the cable-receiving chamber. The hand tool thus is enabled to strip cables. Since the cutting member is contained within the grip, the cable-stripping function can be performed safely.

However, the prior-art hand tool is made to strip cables of only a single size and provides no means to bend the stripped part of a cable. Besides, the structure it employs is relatively complex and involves numerous components, so the manufacturing and assembly are troublesome and time-consuming. For these reasons, the prior-art device needs to be further improved.

SUMMARY OF THE INVENTION

In view of this, the present invention provides a screwdriver having a cable-stripping structure that facilitates stripping cables and bending cores of stripped cables. The screwdriver has a grip including a combining portion having a receiving recess for allowing a screw-driving shaft to be inserted therein, wherein the combining portion further has a first cable-stripping groove, a first slit crossing the first cable-stripping groove, an engaging block having a recessed positioning segment defined between an end of the engaging block and the combining portion, and a fixing hole; a pressing plate, being combined with the combining portion of the grip, wherein the pressing plate has a through hole that has a circumference formed with an engaging recess for fittingly receiving the engaging block, so that the pressing plate is allowed to move along the positioning segment of the engaging block in a travel-limited manner, and wherein the pressing plate further has a second cable-stripping groove positionally corresponding to the first cable-stripping groove, a second slit crossing the second cable-stripping groove, and a holding hole positionally corresponding to the fixing hole; and two knives, each being respectively installed in the first slit of the grip and the second slit of the pressing plate, and each having a cable-stripping blade, wherein the cable-stripping blades of the knife installed in the first slit and the cable-stripping blade of the knife installed in the second slit are aligned with the first cable-stripping groove and the second cable-stripping groove, respectively.

Preferably, the first slit is normal to the first cable-stripping groove when crossing the first cable-stripping groove, and the second slit is normal to the second cable-stripping groove when crossing the second cable-stripping groove.

Preferably, the combining portion comprises four engaging blocks that are separated and surrounding the receiving recess, while the circumference of the through hole of the pressing plate is formed with four engaging recesses, so that each of the four engaging blocks is allowed to be fittingly received in a respective one of the four engaging the four engaging recesses.

The combining portion of the grip has two said first cable-stripping grooves that are two round-bottom grooves having different diameters, and the pressing plate has two said second cable-stripping grooves that are two round-bottom grooves each positionally corresponding to and geometrically identical to a respective one of the first cable-stripping groove.

The two first cable-stripping grooves are parallel to each other, and the two second cable-stripping grooves are also parallel to each other.

The cable-stripping blade of the knife installed in the first slit and the cable-stripping blade of the knife installed in the second slit are sized and shaped in accordance with the first cable-stripping groove and the second cable-stripping groove, respectively.

The combining portion has at least two fixing holes having different diameters, in which the fixing hole having the smaller diameter is closer to a periphery of the combining portion than the fixing hole having the greater diameter, while the pressing plate has at least two holding holes having different diameters, in which the holding hole having the smaller diameter is closer to a periphery of the pressing plate than the holding hole having the greater diameter.

The periphery of the pressing plate is provided with a guiding groove corresponding to the holding hole.

The present invention has the following advantages:

1. The present invention has the cable-stripping structure capable of serving to strip cables of different diameters as required by an in-site wiring operation.

2. The present invention is also useful to help bending a core of a cable that has been stripped so as to facilitate subsequent screwed wiring.

3. The present invention implements a streamlined configuration, so its manufacturing and assembly require less time and reduced costs as compared to the prior-art device. Also, its use is easy and convenient.

DETAILED DESCRIPTION OF THE INVENTION

Figure 1:
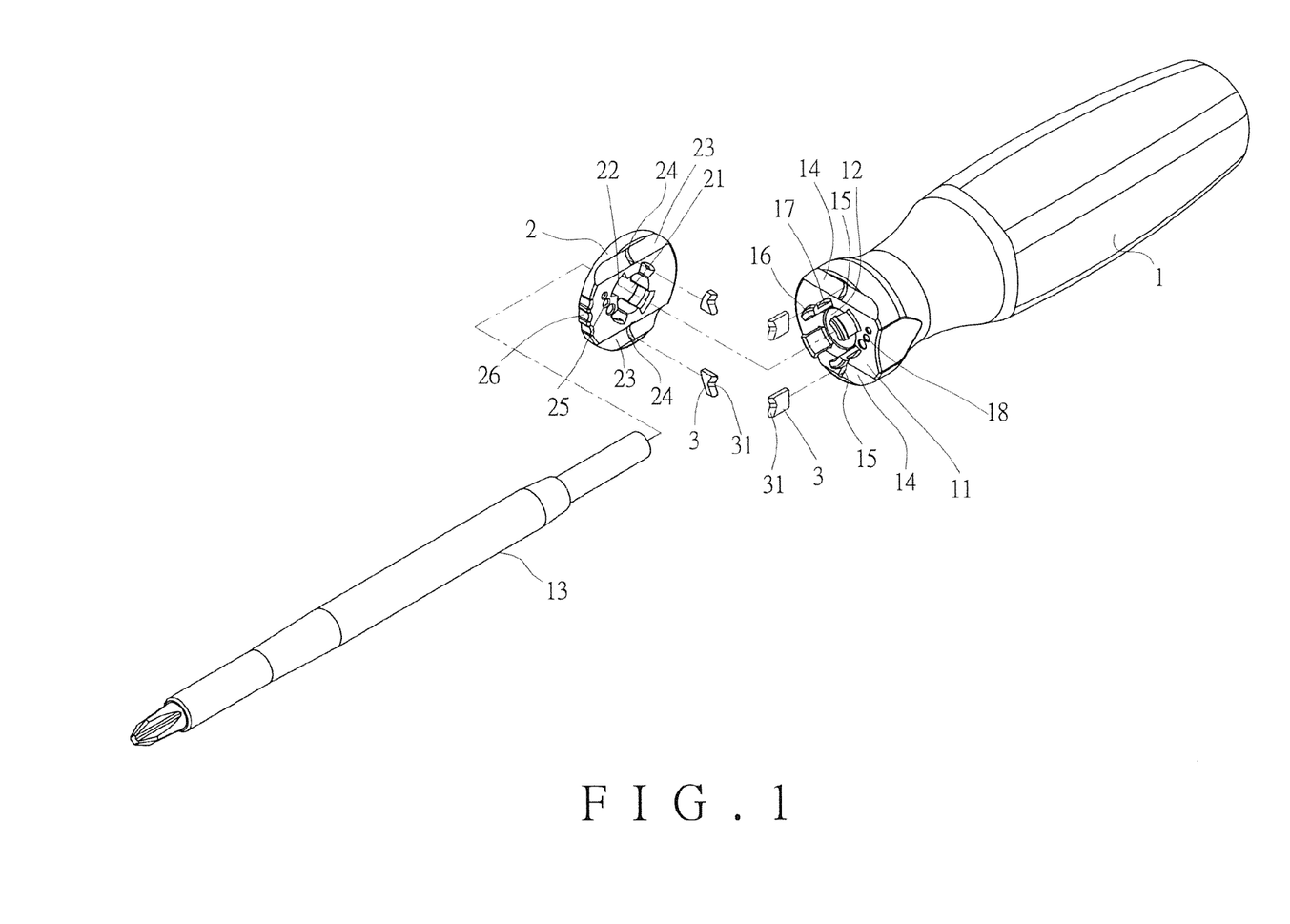
FIG. 1 is an exploded view in accordance with an embodiment of the present invention.
Figure 2:
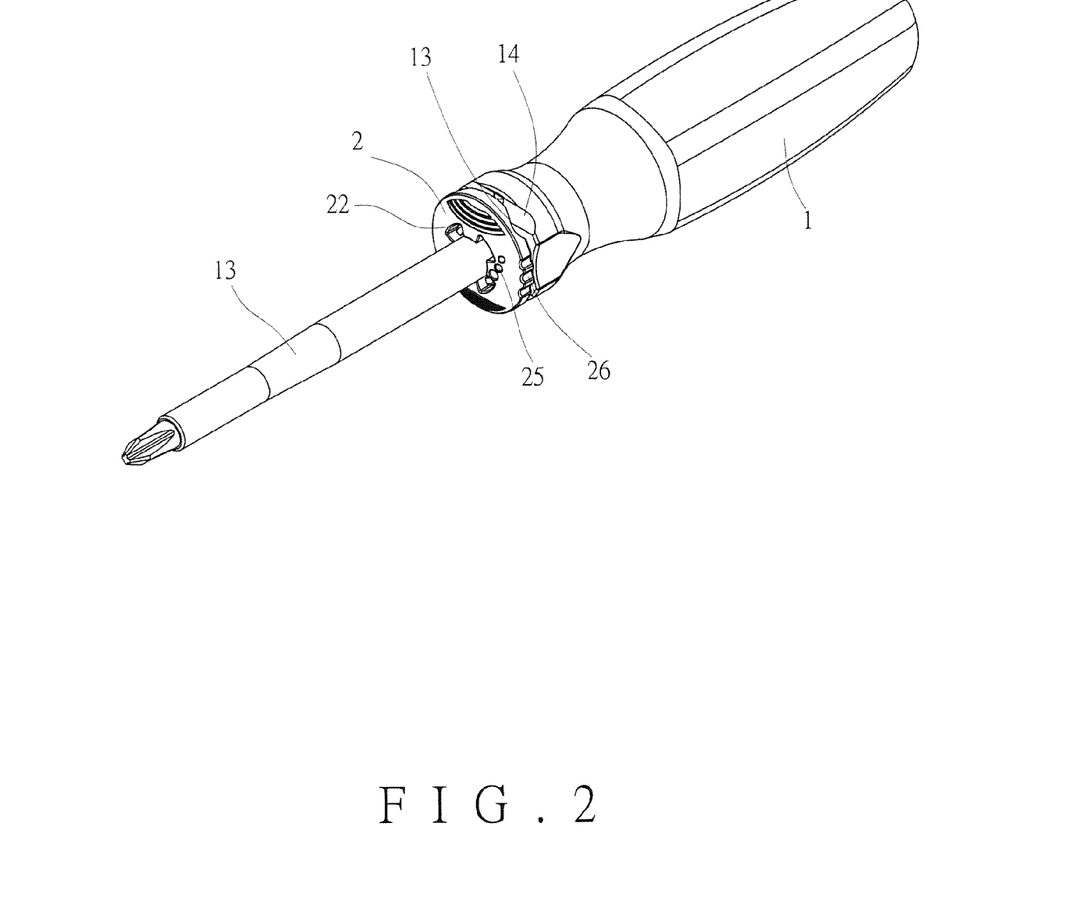
FIG. 2 is a perspective view in accordance with an embodiment of the present invention.

Referring to FIG. 1 and FIG. 2, in one embodiment of the present invention, a screwdriver comprises a grip (1), a pressing plate (2) and knives (3).

Figure 3:
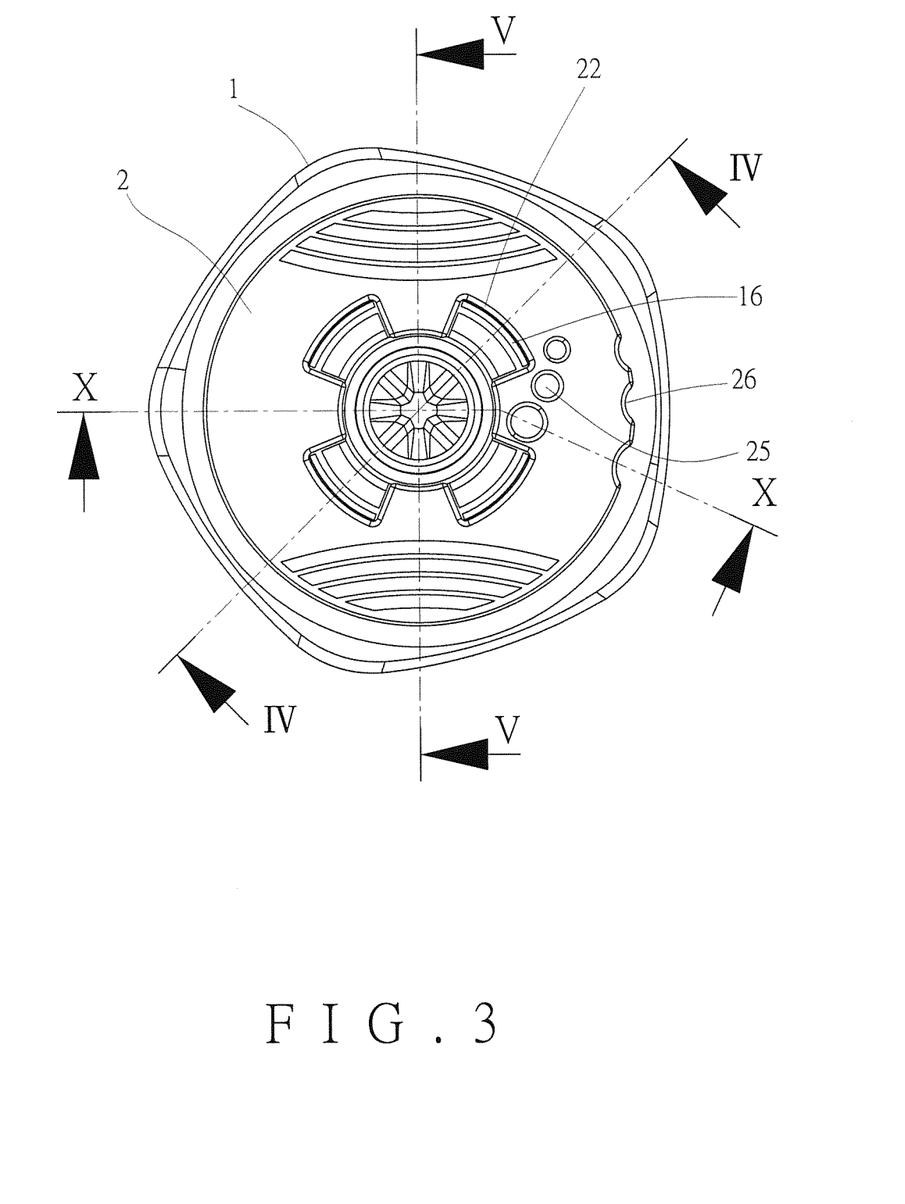
FIG. 3 is a plane view in accordance with an embodiment of the present invention taken from the end of the screw-driving shaft.

The grip (1) has a combining portion (11). The combining portion (11) is provided with a receiving recess (12) for fixedly receiving a screw-driving shaft (13) (as shown in FIG. 3). The combining portion (11) contains at least one first cable-stripping groove (14). In the present embodiment, two first cable-stripping grooves (14) are arranged parallel to each other, but in other embodiments of the present invention the number of the first cable-stripping groove (14) may be different. The two first cable-stripping grooves (14) are round-bottom grooves having different diameters. The combining portion (11) has first slits (15) each crossing normally a respective one of the two first cable-stripping grooves (14). The combining portion (11) further has at least one engaging block (16) raised therefrom. In the present embodiment, four engaging blocks (16) are separated and surrounding the receiving recess (12), but the number thereof is not limited thereto. Each of the four engaging blocks (16) has a recessed positioning segment (17) extending vertically between a distal end of the engaging block (16) and the combining portion (11). The combining portion (11) has at least one fixing hole (18). In the present embodiment, three fixing holes (18) are provided, but the number thereof is not limited thereto. Each of the three fixing holes (18) has a unique diameter, and the one having the smaller diameter is closer to a periphery of the combining portion (11) than the one having the greater diameter.

Figure 4:
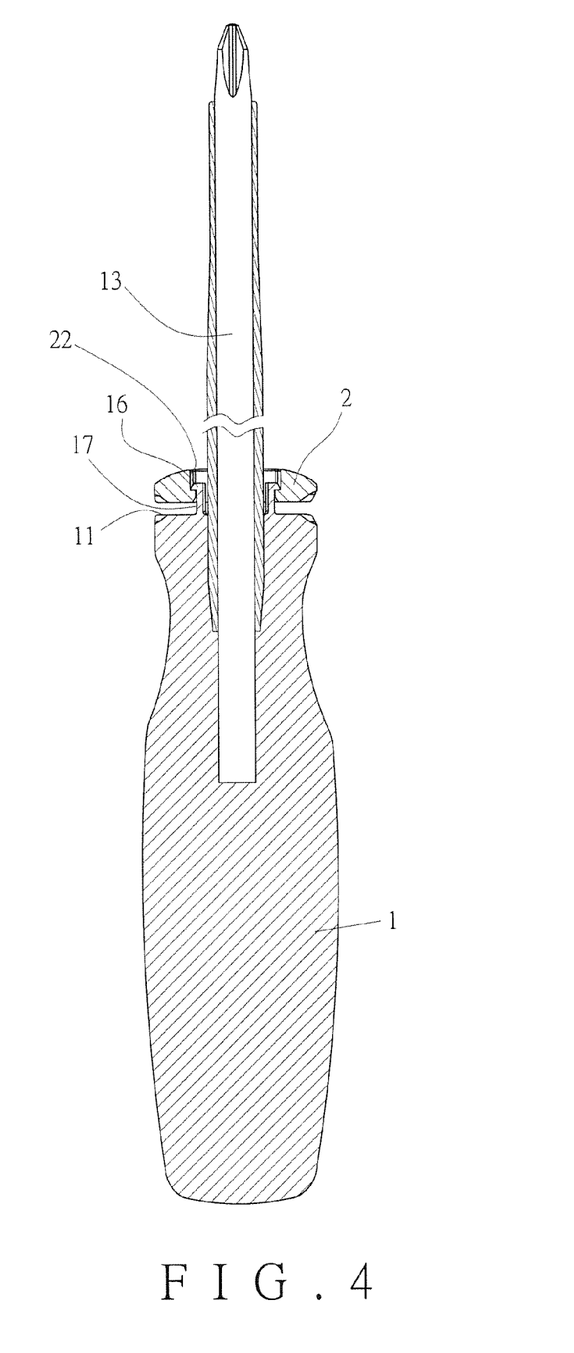
FIG. 4 is a cross-sectional view taken along Line IV-IV of FIG. 3.
Figure 5:
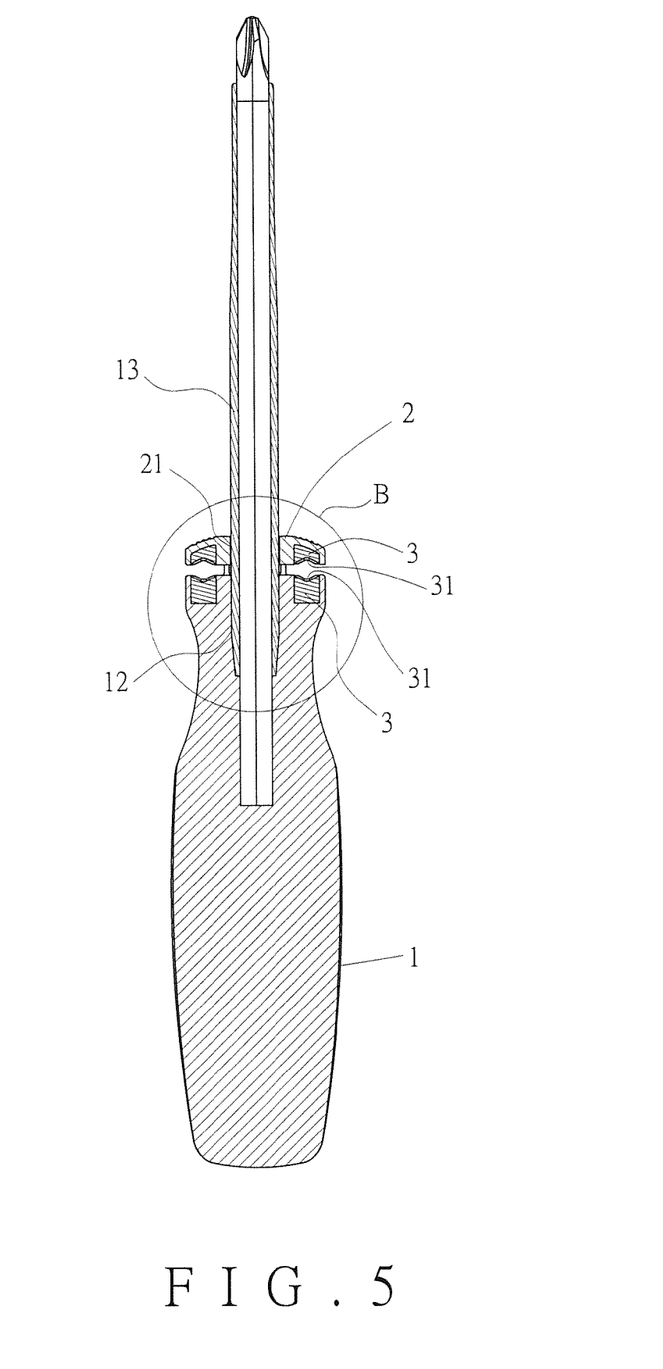
FIG. 5 is a cross-sectional view taken along Line V-V of FIG. 3.
Figure 6:
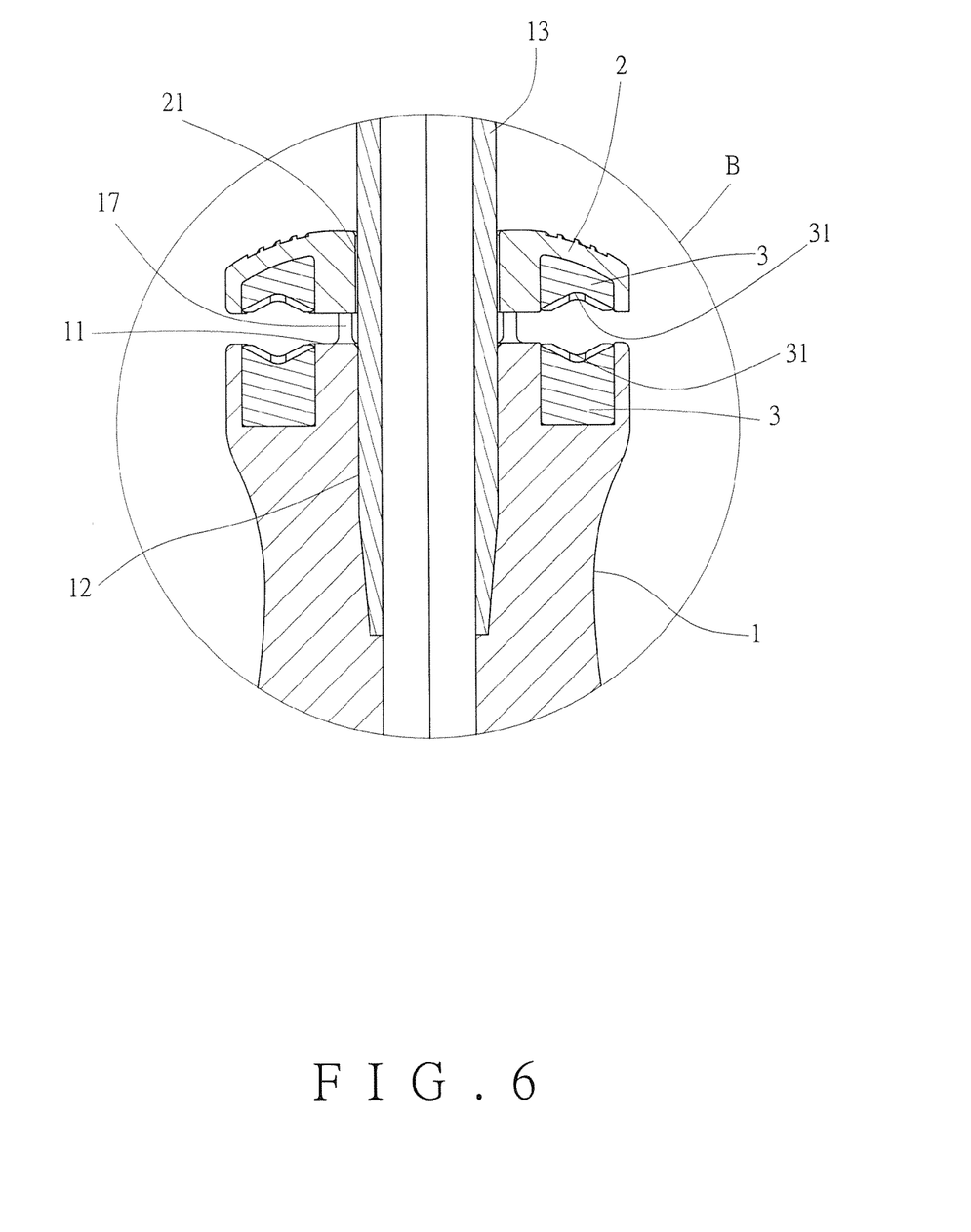
FIG. 6 is a close-up view of Part B of FIG. 5.

The pressing plate (2) is combined with the combining portion (11) of the grip (1). The pressing plate (2) has a through hole (21) for allowing the screw-driving shaft (13) of the grip (1) to pass therethrough. The through hole (21) has a circumference formed with at least one engaging recess (22). In the present embodiment, the circumference is formed with four engaging recesses (22), but the number thereof is not limited thereto. Each of the four engaging recesses (22) fittingly receives and is engaged with a respective one of the four engaging blocks (16), so that the pressing plate (2) is allowed to move along the positioning segments (17) of the engaging blocks (16) in a travel-limited manner (as shown in FIG. 4), while the pressing plate (2) is retained by the distal ends of the engaging blocks (16) from coming off. On the pressing plate (2), at sites corresponding to the two first cable-stripping grooves (14) of the combining portion (11), there are two second cable-stripping grooves (23) each positionally corresponding to and geometrically identical to a respective one of the two first cable-stripping grooves (14) (as shown in FIG. 5 and FIG. 6). In the present embodiment, two parallel second cable-stripping grooves (23) are provided, but the number thereof is not limited thereto. The pressing plate (2) further has second slits (24) each crossing normally a respective one of the two second cable-stripping grooves (23). Also, the pressing plate (2) has at least one holding hole (25) of the same number as that of the at least one fixing hole (18). In the present embodiment, three holding holes (25) and three fixing holes (18) are provided, but the number thereof is not limited thereto. The three holding holes (25) have different diameters, and the one having the smaller diameter is closer to a periphery of the pressing plate (2) than the one having the greater diameter. Thereby, electric wires having larger diameters can be bent with the greater bending radiuses, while electric wires having smaller diameters can be bent with the smaller bending radius. Preferably, in the present embodiment, the periphery of the pressing plate (2) is provided with three guiding grooves (26) each are sized corresponding to a respective one of the three holding holes (25). Therefore, the holding hole (25) having the greater diameter is further away from its corresponding guiding groove (26), so that electric wires having larger diameters can be bent with the greater bending radiuses. On the contrary, the holding hole (25) having the smaller diameter is closer to its corresponding guiding groove (26), so that electric wires having smaller diameters can be bent with the smaller bending radius.

In the present embodiment, the two first slits (15) of the grip (1) and the two second slits (24) of the pressing plate (2) each are provided with a knife (3) installed therein. The four knives (3) each have a cable-stripping blade (31). Each of the cable-stripping blades (31) of the four knives (3) is aligned with its corresponding first cable-stripping groove (14) or second cable-stripping groove (23), and is sized and shaped in accordance with its corresponding first cable-stripping groove (14) or second cable-stripping groove (23) as well.

Figure 7:
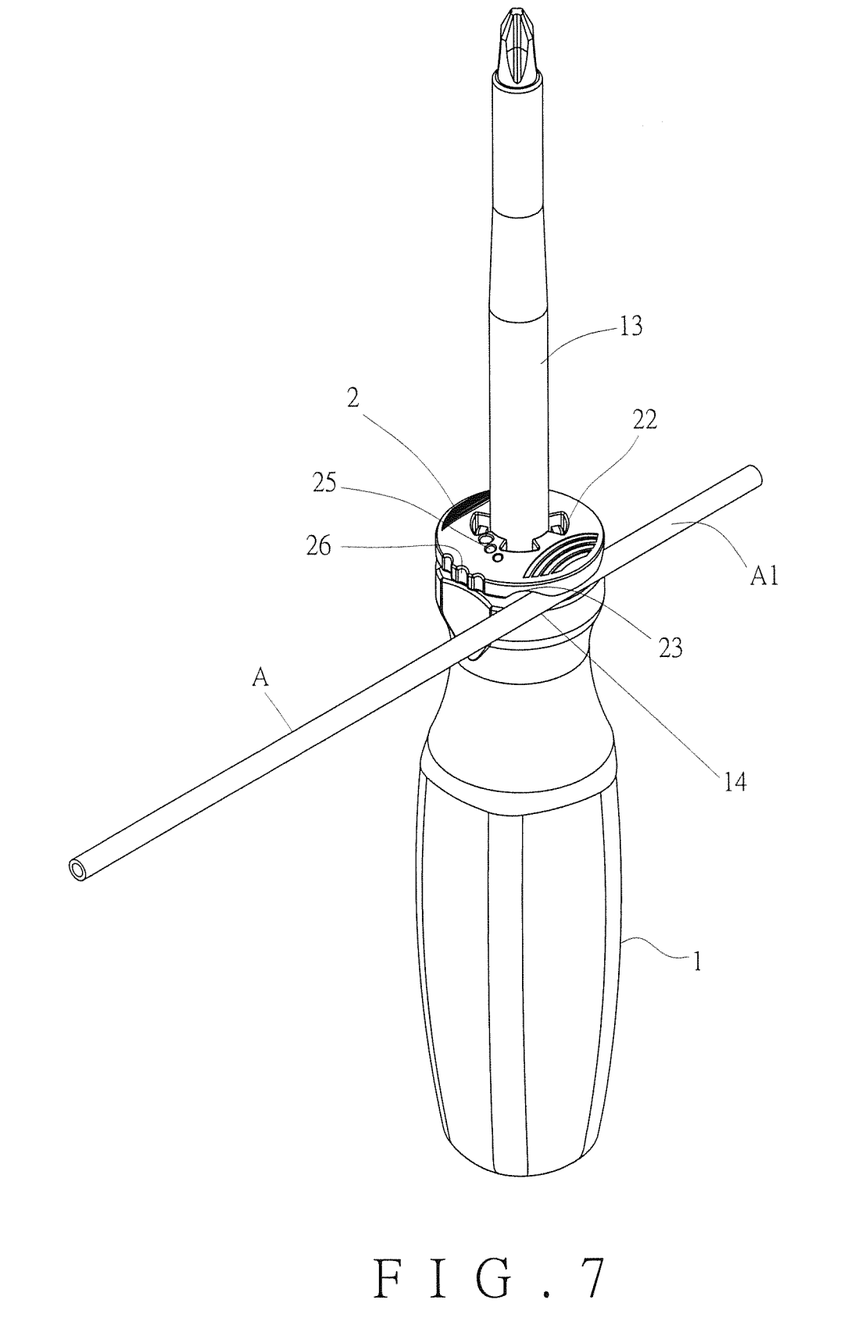
FIG. 7 is an applied view in accordance with an embodiment of the present invention showing an electric wire to be stripped is placed in the first cable-stripping groove.
Figure 8:
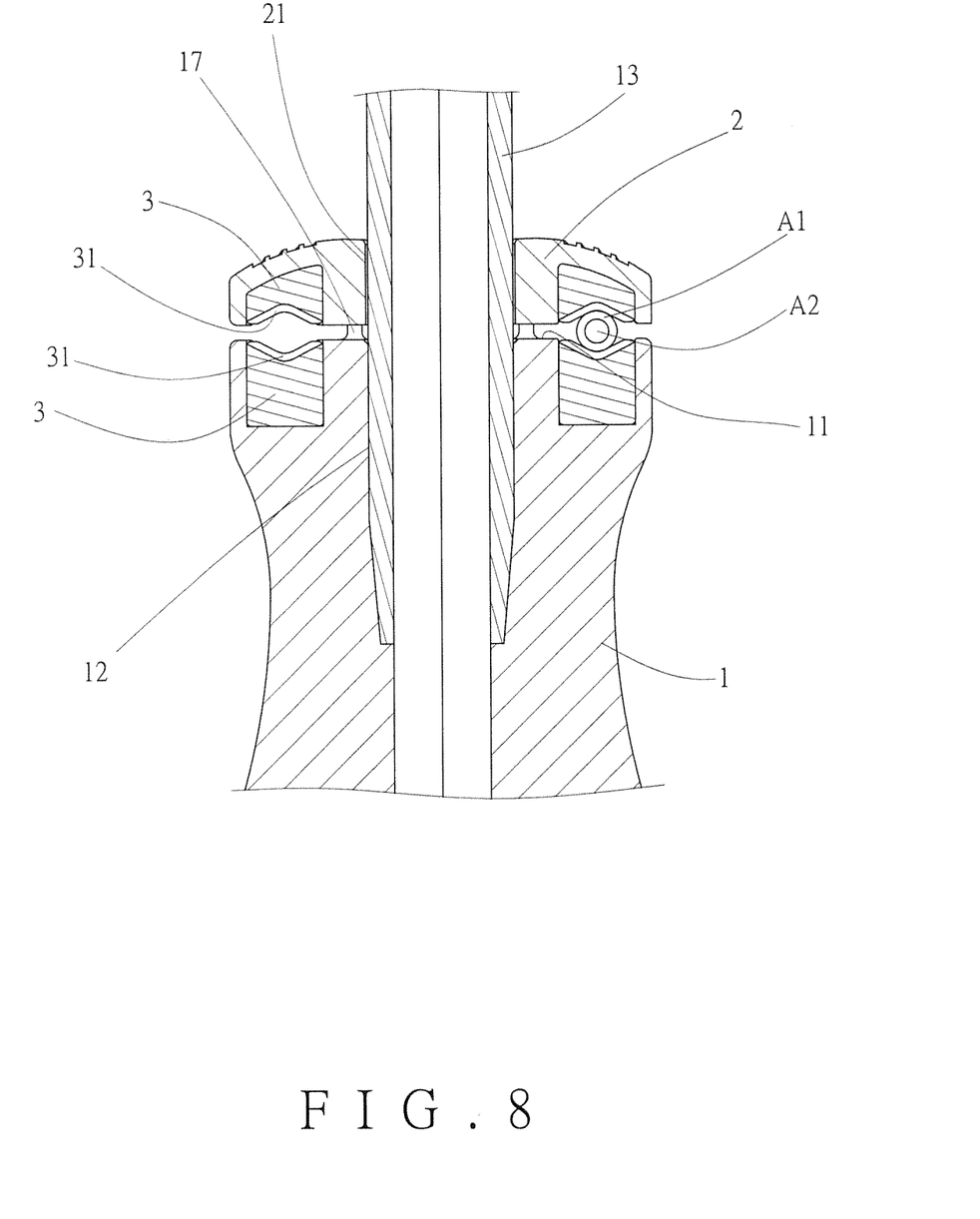
FIG. 8 is a schematic drawing illustrating the pressing plate in accordance with an embodiment of the present invention pressed.
Figure 9:
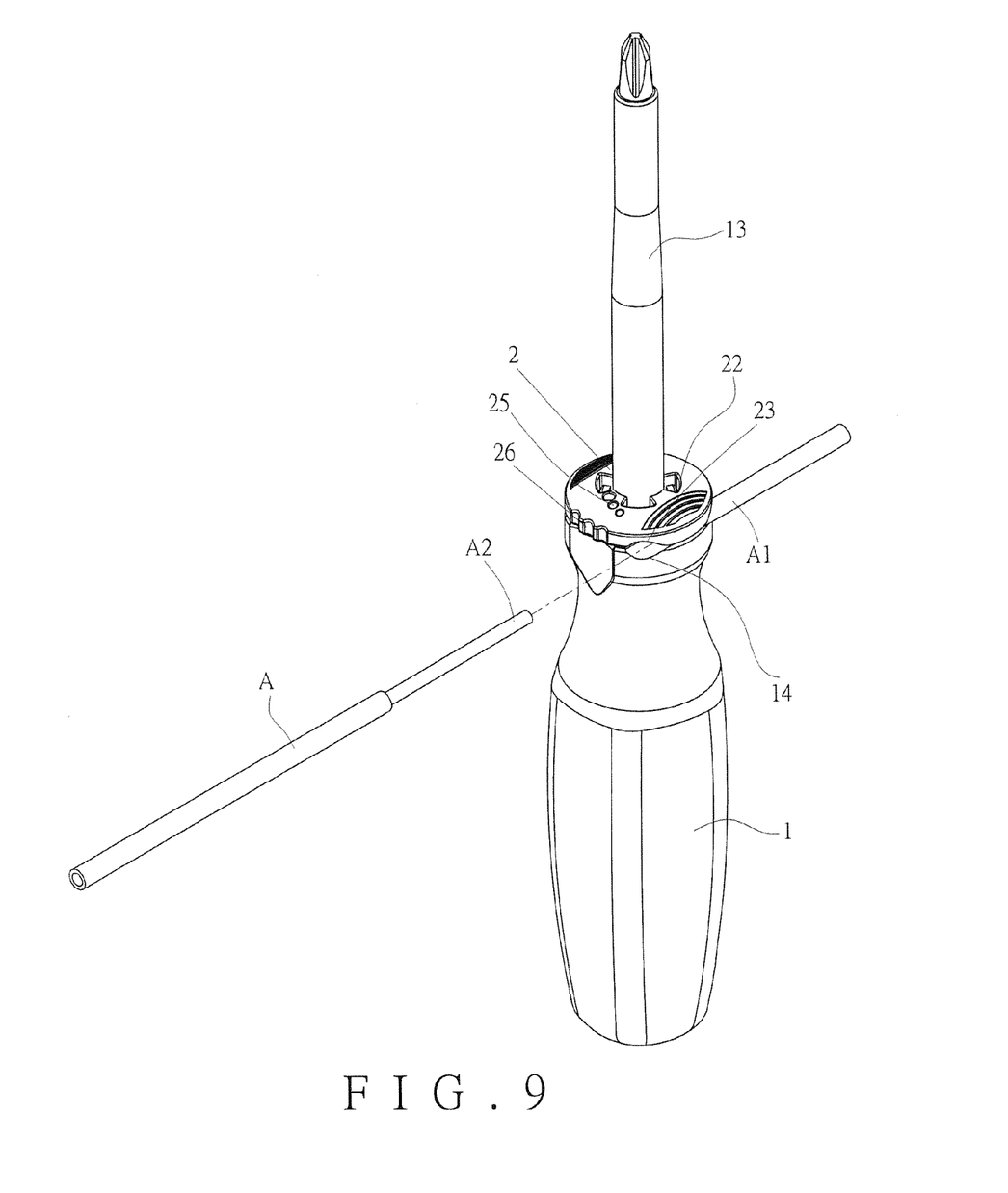
FIG. 9 is schematic drawing illustrating the electric wire having been partially stripped.

In use, in addition to be used as a normal screwdriver that drives screws, the present invention can also strip an electric wire (A). Referring to FIG. 6 and FIG. 7, the pressing plate (2) is manually displaced to move away in an axial direction from the combining portion (11) of the grip (1) in a travel-limited manner, so that the electric wire (A) can be placed between a corresponding first cable-stripping groove (14) and a corresponding second cable-stripping groove (23) that fit a diameter of the electric wire (A). Then a to-be-striped end (A1) of the electric wire (A) can be placed to align with the cable-stripping blades (31) installed in the corresponding first cable-stripping groove (14) and the corresponding second cable-stripping groove (23) according to a desired cable-stripping length. After that, the pressing plate (2) can be pressed to move toward the combining portion (11) in a travel-limited manner, as shown in FIG. 8, so that the corresponding second cable-stripping groove (23) of the pressing plate (2) is also drawn toward the corresponding first cable-stripping groove (14) of the combining portion (2) and thus allow the to-be-striped end (A1) of the electric wire (A) to be grasped therebetween, and the to-be-striped end (A1) of the electric wire (A) is also held by the two cable-stripping blades (31) of the knives (3) installed in the corresponding first (14) and second cable-stripping grooves (23). At this time, by pulling the electric wire (A) outward, the two cable-stripping blades (31) of the knives (3) in the corresponding first (14) and second cable-stripping grooves (23) can remove the jacket previously wrapping the to-be-striped end (A1) of the electric wire (A) from the electric wire (A) and expose the core (A2) of the electric wire (A), as shown in FIG. 9. After the stripping operation, the pressing plate (2) is no more pressed, so the jacket previously wrapping the to-be-striped end (A1) of the electric wire (A) can be taken out from the corresponding first (14) and second cable-stripping grooves (23).

Other electric wires of different diameters can be processed using the present invention by repeating the same procedures as described above, provided that the wire to be processed is placed between a corresponding first cable-stripping groove (14) and a corresponding second cable-stripping groove (23) that a size of the wire. Thus, the present invention can use its differently sized first cable-stripping grooves (14) and second cable-stripping grooves (23) to handle electric wires of different diameters.

Figure 10:
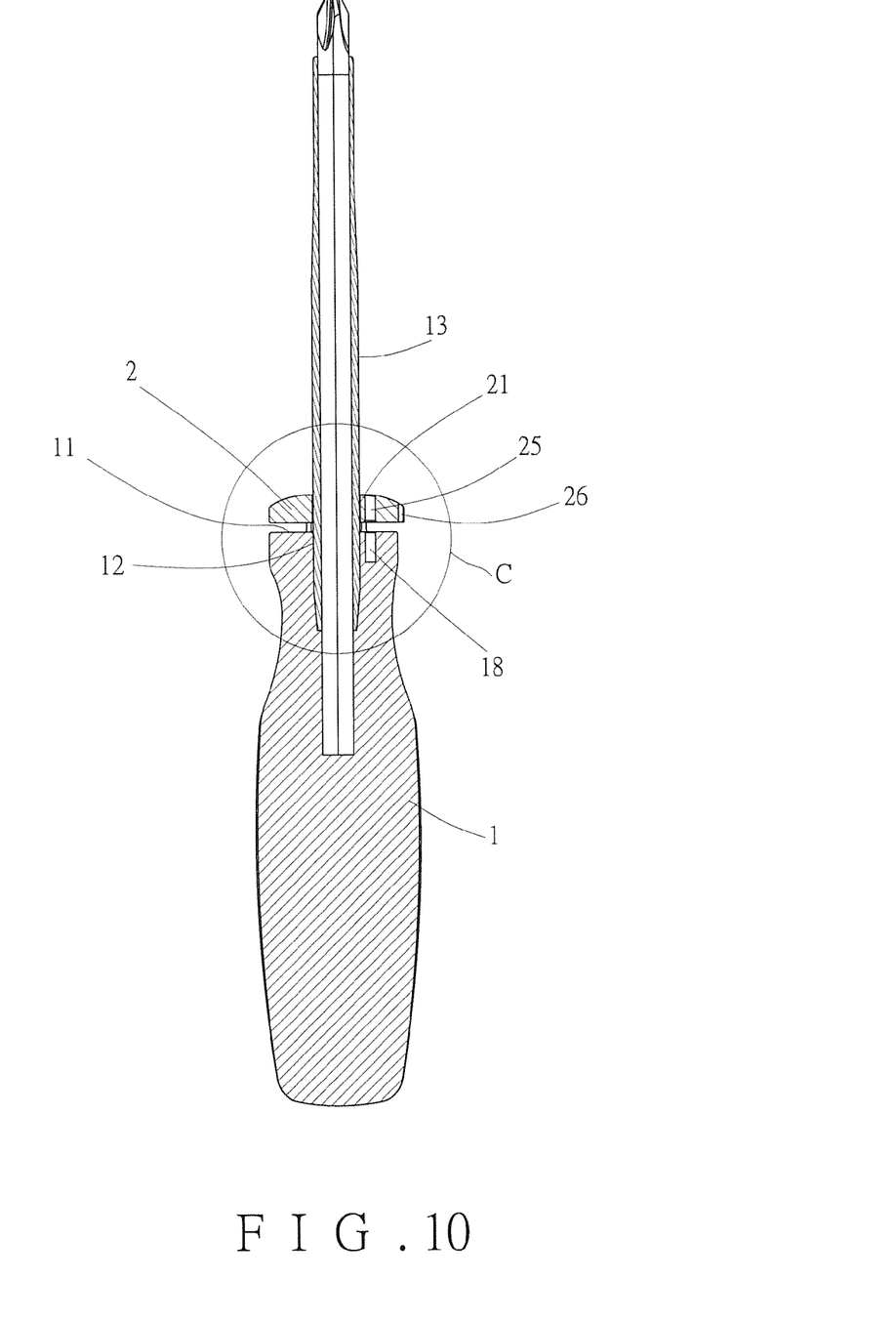
FIG. 10 is a cross-sectional view taken along Line X-X of FIG. 3.
Figure 11:
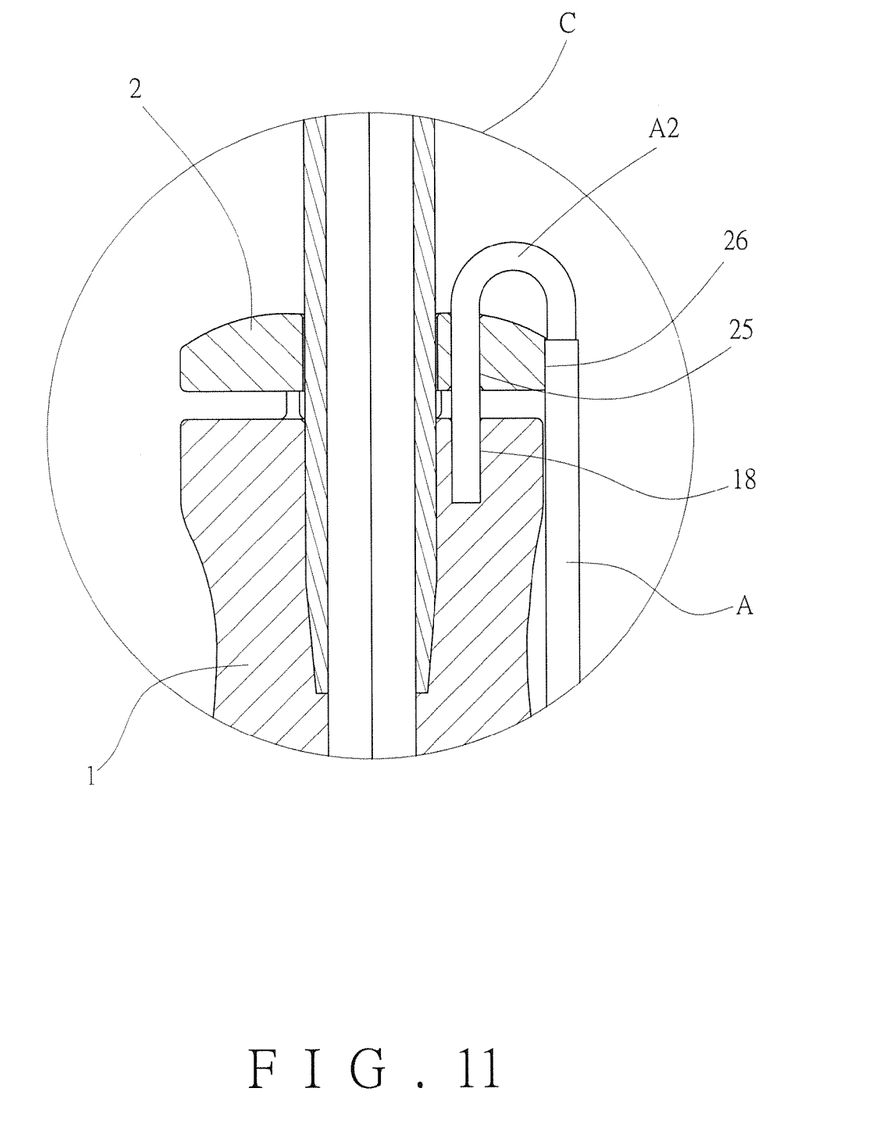
FIG. 11 is a schematic drawing illustrating in Part C of FIG. 10 a fixing hole and a holding hole facilitating bending the core of the stripped electric wire.

Referring to FIG. 10 and FIG. 11, for bending the core (A2) of the electric wire (A), the core (A2) of the electric wire (A) can be inserted into a corresponding holding hole (25) and a corresponding fixing hole (18) that fit a size of the core (A2), and a user can manually bend the electric wire (A) while the core (A2) is positioned firmly by both the corresponding holding hole (25) and the corresponding fixing hole (18), so that the electric wire (A) can be bent to be pressed against a corresponding guiding groove (26). In this manner, the core (A2) of the electric wire (A) can be formed with a desired angle that facilitates subsequent screwed wiring. Electric wires having different diameters can be bent by selecting a corresponding holding hole (25) and a corresponding fixing hole (18) that have matching sizes. The core (A2) of the electric wire (A) having the greater diameter can thereby be bent with the greater bending radiuses and the core (A2) of the electric wire (A) having the smaller diameter can thereby be bent with the smaller bending radius.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A screwdriver having a cable-stripping structure, the screwdriver comprising:
   a grip, including a combining portion having a receiving recess for allowing a screw-driving shaft to be inserted therein, wherein the combining portion further has a first cable-stripping groove, a first slit crossing the first cable-stripping groove, an engaging block having a recessed positioning segment defined between an end of the engaging block and the combining portion, and a fixing hole;
   a pressing plate, being combined with the combining portion of the grip, wherein the pressing plate has a through hole that has a circumference formed with an engaging recess for fittingly receiving the engaging block, so that the pressing plate is allowed to move along the positioning segment of the engaging block in a travel-limited manner, and wherein the pressing plate further has a second cable-stripping groove positionally corresponding to the first cable-stripping groove, a second slit crossing the second cable-stripping groove, and a holding hole positionally corresponding to the fixing hole; and
   two knives, each being respectively installed in the first slit of the grip and the second slit of the pressing plate, and each having a cable-stripping blade, wherein the cable-stripping blade of the knife installed in the first slit and the cable-stripping blade of the knife installed in the second slit are aligned with the first cable-stripping groove and the second cable-stripping groove, respectively.

2. The screwdriver of claim 1, wherein the first slit is normal to the first cable-stripping groove when crossing the first cable-stripping groove, and the second slit is normal to the second cable-stripping groove when crossing the second cable-stripping groove.

3. The screwdriver of claim 1, wherein the combining portion comprises four said engaging blocks that are separated and surrounding the receiving recess, while the circumference of the through hole of the pressing plate is formed with four said engaging recesses, so that each of said four engaging blocks is allowed to be fittingly received in a respective one of said four engaging recesses.

4. The screwdriver of claim 1, wherein the combining portion of the grip has two said first cable-stripping grooves that are two round-bottom grooves having different diameters, and the pressing plate has two said second cable-stripping grooves that are two round-bottom grooves each positionally corresponding to and geometrically identical to a respective one of said first cable-stripping grooves.

5. The screwdriver of claim 4, wherein the two first cable-stripping grooves are parallel to each other, and the two second cable-stripping grooves are also parallel to each other.

6. The screwdriver of claim 1, wherein the cable-stripping blade of the knife installed in the first slit and the cable-stripping blade of the knife installed in the second slit are sized and shaped in accordance with the first cable-stripping groove and the second cable-stripping groove, respectively.

7. The screwdriver of claim 1, wherein the combining portion has at least two said fixing holes having different diameters, in which the fixing hole having the smaller diameter is closer to a periphery of the combining portion than the fixing hole having the greater diameter, while the pressing plate has at least two said holding holes having different diameters, in which the holding hole having the smaller diameter is closer to a periphery of the pressing plate than the holding hole having the greater diameter.

8. The screwdriver of claim 1, wherein the periphery of the pressing plate is provided with a guiding groove corresponding to the holding hole.

* * * * *